United States Patent
Ide et al.

(10) Patent No.: US 11,487,650 B2
(45) Date of Patent: Nov. 1, 2022

(54) DIAGNOSING ANOMALIES DETECTED BY BLACK-BOX MACHINE LEARNING MODELS

(71) Applicant: International Business Machines Corporation, Armonk, NY (US)

(72) Inventors: Tsuyoshi Ide, Harrison, NY (US); Amit Dhurandhar, Yorktown Heights, NY (US); Jiri Navratil, Cortlandt Manor, NY (US); Naoki Abe, Rye, NY (US); Moninder Singh, Farmington, CT (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/882,430

(22) Filed: May 22, 2020

(65) Prior Publication Data

US 2021/0365358 A1 Nov. 25, 2021

(51) Int. Cl.
*G06F 11/07* (2006.01)
*G06F 11/36* (2006.01)
(Continued)

(52) U.S. Cl.
CPC ...... *G06F 11/3692* (2013.01); *G06F 11/0751* (2013.01); *G06F 11/0766* (2013.01);
(Continued)

(58) Field of Classification Search
CPC ............ G06F 11/3692; G06F 11/3684; G06F 11/079; G06F 11/0751; G06F 11/0766; G06N 20/00; G06N 5/04
See application file for complete search history.

(56) References Cited

U.S. PATENT DOCUMENTS 8,392,760 B2 * 3/2013 Kandula ............ G06F 11/0727
714/25
10,218,732 B2 2/2019 Wittenschlaeger
(Continued)

FOREIGN PATENT DOCUMENTS

GN 102122133 A 7/2011

OTHER PUBLICATIONS

Amarasinghe, et al., "Toward Explainable Deep Neural Network Based Anomaly Detection", 11th International Conference on Human System Interaction (HSI), 2018 IEEE, 8 pages.
(Continued)

*Primary Examiner* — Jonathan D Gibson
(74) *Attorney, Agent, or Firm* — Edward P. Li

(57) ABSTRACT

A computer-implemented method, a computer program product, and a computer system for diagnosing anomalies detected by a black-box machine learning model. A computer determines a local variance of a test sample in a test dataset, where the local variance represents uncertainty of a prediction by the black-box machine learning model. The computer initializes optimal compensations for the test sample, where the optimal compensations are optimal perturbations to test sample values of respective components of a multivariate input variable. The computer determines local gradients for the test sample. Based on the local variance and the local gradients, the computer updates the optimal compensations until convergences of the optimal compensations are reached. Using the optimal compensations, the computer diagnoses the anomalies detected by the black-box machine learning model.

20 Claims, 7 Drawing Sheets

(51) Int. Cl.
  *G06N 5/04* (2006.01)
  *G06N 20/00* (2019.01)
(52) U.S. Cl.
  CPC .......... *G06F 11/3684* (2013.01); *G06N 5/04* (2013.01); *G06N 20/00* (2019.01)

(56) References Cited

U.S. PATENT DOCUMENTS

| | | | | |
|---|---|---|---|---|
| 10,936,966 | B2* | 3/2021 | Zavesky | G06N 20/00 |
| 11,061,756 | B2* | 7/2021 | Aoyama | G06F 11/0787 |
| 2007/0112824 | A1* | 5/2007 | Lock | G06F 11/0754 |
| | | | | 707/999.102 |
| 2008/0195369 | A1* | 8/2008 | Duyanovich | G06F 11/0709 |
| | | | | 703/22 |
| 2010/0218031 | A1* | 8/2010 | Agarwal | G06F 11/079 |
| | | | | 714/E11.029 |
| 2016/0124823 | A1* | 5/2016 | Ruan | G06F 11/079 |
| | | | | 714/26 |
| 2018/0239660 | A1* | 8/2018 | Guha | G06F 11/0709 |
| 2019/0138383 | A1* | 5/2019 | Barowy | G06F 11/0751 |
| 2019/0205193 | A1* | 7/2019 | Wu | G06F 11/2268 |
| 2019/0236134 | A1* | 8/2019 | Galitsky | G06F 16/35 |
| 2019/0253328 | A1* | 8/2019 | Kolar | H04L 43/0823 |
| 2020/0050766 | A1* | 2/2020 | Bos | G06F 21/577 |
| 2020/0143005 | A1* | 5/2020 | Nair | G06F 16/285 |
| 2020/0167691 | A1* | 5/2020 | Golovin | G06N 3/08 |
| 2020/0167694 | A1* | 5/2020 | Pisner | G06F 16/9024 |
| 2020/0234158 | A1* | 7/2020 | Pai | G06N 20/00 |
| 2020/0294231 | A1* | 9/2020 | Tosun | G06T 7/0012 |
| 2020/0302318 | A1* | 9/2020 | Hetherington | G06N 5/003 |
| 2021/0049503 | A1* | 2/2021 | Nourian | G06N 20/20 |
| 2021/0089828 | A1* | 3/2021 | Arik | G06N 3/02 |
| 2021/0133630 | A1* | 5/2021 | Dalli | G06N 20/00 |
| 2021/0136098 | A1* | 5/2021 | Stergioudis | G06N 20/20 |
| 2021/0142169 | A1* | 5/2021 | De | G06N 20/20 |
| 2021/0166151 | A1* | 6/2021 | Kennel | G06N 20/00 |
| 2021/0232495 | A1* | 7/2021 | Tangirala | G06F 40/279 |
| 2021/0287119 | A1* | 9/2021 | Rink | G06N 5/04 |

OTHER PUBLICATIONS

Casalicchio, et al, "Visualizing the Feature Importance for Black Box Models", Joint European Conference on Machine Learning and Knowledge Discovery in Databases, Springer 2018, pp. 655-670.

Chen, et al, "Learning to Explain: An Information-Theoretic Perspective on Model Interpretation", Proceedings of the 35th International Conference on Machine Learning, 2018, pp. 882-891.

Costabello, et al., "On Explainable AI: From Theory to Motivation, Applications and Limitations", Tutorial of the AAAI Conference on Artificial Intelligence, 2019, 160 pages.

Datta, et al., "Algorithmic Transparency via Quantitative Input Influence: Theory and Experiments with Learning Systems", 2016 IEEE Symposium on Security and Privacy, pp. 598-617.

Dhurandhar, et al., "Explanations based on the Missing: Towards Contrastive Explanations with Pertinent Negatives", 32nd Conference on Neural Information Processing Systems (NeurIPS 2018), 12 pages.

Dhurandhar, et al., "Improving Simple Models with Confidence Profiles", 32nd Conference on Neural Information Processing Systems (NeurIPS 2018), 11 pages.

Fong, et al., "Interpretable Explanations of Black Boxes by Meaningful Perturbation", 2017 IEEE International Conference on Computer Vision, pp. 3449-3457.

Giurgiu, et al., "Additive Explanations for Anomalies Detected from Multivariate Temporal Data", CIKM '19, Nov. 3-7, 2019, pp. 2245-2248.

Gulenko, et al., "Detecting Anomalous Behavior of Black-Box Services Modeled with Distance-Based Online Clustering", 2018 IEEE 11th International Conference on Cloud Computing (CLOUD), 9 pages.

Gurumoorthy, et al., "Efficient Data Representation by Selecting Prototypes with Importance Weights", 2019 IEEE International Conference on Data Mining (ICDM), pp. 260-269.

Ibidunmoye, et al., "A Black-Box Approach for Detecting Systems Anomalies in Virtualized Environments", 2017 International Conference on Cloud and Autonomic Computing (ICCAC), 13 pages.

Koh, et al., "Understanding Black-box Predictions via Influence Functions", Proceedings of the 34 th International Conference on Machine Learning, PMLR 70, 2017, 10 pages.

Lundberg, et al., "A Unified Approach to Interpreting Model Predictions", 31st Conference on Neural Information Processing Systems (NIPS 2017), 10 pages.

Molnar, Christopher, "Interpretable Machine Learning: A Guide for Making Black Box Models Explainable", Lean Publishing, version published on Feb. 10, 2019, 251 pages.

Parikh, et al., "Proximal Algorithms", Foundations and Trends in Optimization, vol. 1, No. 3, (2013) pp. 123-231.

Ribeiro, et al., "Anchors: High-Precision Model-Agnostic Explanations", The Thirty-Second AAAI Conference on Artificial Intelligence (AAAI-18), pp. 1527-1535.

Ribeiro, et al., "'Why Should I Trust You?' Explaining the Predictions of Any Classifier", Proceedings of the 22nd ACM SIGKDD international conference on knowledge discovery and data mining, KDD 2016 San Francisco, CA, USA, pp. 1135-1144.

Roy, et al., "Selection of Tuning Parameters, Solution Paths and Standard Errors for Bayesian Lassos", Bayesian Analysis (2017), 12, No. 3, pp. 753-778.

Strumbelj, et al., "An Efficient Explanation of Individual Classifications using Game Theory", Journal of Machine Learning Research, 11, (2010), pp. 1-18.

Strumbelj, et al., "Explaining prediction models and individual predictions with feature contributions", Knowl Inf Syst (2014), 41, p. 647-665.

Zhang, et al., "ACE—An Anomaly Contribution Explainer for Cyber-Security Applications", 2019 IEEE International Conference on Big Data (Big Data), pp. 1991-2000.

Zintgraf, et al., "Visualizing Deep Neural Network Decisions: Prediction Difference Analysis", 5th International Conference on Learning Representations, ICLR2017, 12 pages.

\* cited by examiner

DIAGNOSING ANOMALIES DETECTED BY BLACK-BOX MACHINE LEARNING MODELS

BACKGROUND

The present invention relates generally to explainability of artificial intelligence (AIX), and more particularly to diagnosing anomalies detected by black-box machine learning models.

Since the remarkable success of deep learning and its growing real-world deployment, there are increasing concerns about the black-box nature of machine learning (ML) algorithms. In response, explainability of artificial intelligence (AIX) has become one of the major recent research topics in the artificial intelligence (AI) community. A major focus of recent AIX research is post hoc modeling, typically by providing an easy-to-interpret surrogate model and additional statistics for the model; examples include feature subset selection, feature importance scoring, sample importance scoring, and neural networks comprehension.

In spite of anomaly detection being one of the most important industrial ML applications, most studies assume full access to the prediction model and little work has been done on model-agnostic explainability in the context of anomaly detection. Most of the model agnostic AIX research is designed for classification, often restricted to image classification.

For the task of input variable scoring, there are at least two general AIX frameworks. Two approaches apply to variable importance scoring in black-box regression-based anomaly detection, namely the Shapley value and Local Interpretable Model-Agnostic Explanations (LIME). In the context of anomaly detection from noisy and real-valued data, recent studies have proposed a method built on the LIME and the Shapley values, respectively. While these belong to the earliest model-agnostic AIX studies for anomaly detection, they naturally inherit the limitations of the existing approaches.

Another research thread relevant to our work revolves around the counterfactual approach, which focuses on what is missing in the model (or training data) rather than what exists. In the context of image classification, the idea of counterfactuals is naturally translated into perturbation-based explanation. Recently, the idea of contrastive explanation is proposed, and the idea attempts to find a perturbation best characterizing a classification instance such that the probability of choosing a different class supersedes the original prediction.

SUMMARY

In one aspect, a computer-implemented method for diagnosing anomalies detected by a black-box machine learning model. The computer-implemented method includes determining a local variance of a test sample in a test dataset, the local variance representing uncertainty of a prediction by the black-box machine learning model. The computer-implemented method further includes initializing, for the test sample, optimal compensations, where the optimal compensations are optimal perturbations to test sample values of respective components of a multivariate input variable. The computer-implemented method further includes determining, for the test sample, local gradients at the test sample values plus values of respective ones of the optimal compensations. The computer-implemented method further includes updating the optimal compensations, based on the local variance and the local gradients. The computer-implemented method further includes determining whether the optimal compensations converge. The computer-implemented method further includes diagnosing the anomalies detected by the black-box machine learning model, using the optimal compensations, in response to determining that the optimal compensations converge.

The computer-implemented method further includes, in response to determining that the optimal compensations do not converge, reiterating determining the local gradients, updating the optimal compensations, and determining whether the optimal compensations converge, with latest updated optimal compensations, until convergences of optimal compensations are reached.

In another aspect, a computer program product for diagnosing anomalies detected by a black-box machine learning model is provided. The computer program product comprises a computer readable storage medium having program instructions embodied therewith, and the program instructions are executable by one or more processors. The program instructions are executable to determine a local variance of a test sample in a test dataset, the local variance representing uncertainty of a prediction by the black-box machine learning model; initialize, for the test sample, optimal compensations, where the optimal compensations are optimal perturbations to test sample values of respective components of a multivariate input variable; determine, for the test sample, local gradients at the test sample values plus values of respective ones of the optimal compensations; update the optimal compensations, based on the local variance and the local gradients; and determine whether the optimal compensations converge. In response to determining that the optimal compensations converge, the program instructions are executable to diagnose the anomalies detected by the black-box machine learning model, using the optimal compensations.

The computer program product further comprises the program instructions executable to, in response to determining that the optimal compensations do not converge, reiterate determining the local gradients, updating the optimal compensations, and determining whether the optimal compensations converge, with latest updated optimal compensations, until convergences of optimal compensations are reached.

In yet another aspect, a computer system for diagnosing anomalies detected by a black-box machine learning model is provided. The computer system comprises one or more processors, one or more computer readable tangible storage devices, and program instructions stored on at least one of the one or more computer readable tangible storage devices for execution by at least one of the one or more processors. The program instructions are executable to determine a local variance of a test sample in a test dataset, the local variance representing uncertainty of a prediction by the black-box machine learning model. The program instructions are further executable to initialize optimal compensations for the test sample, where the optimal compensations are optimal perturbations to test sample values of respective components of a multivariate input variable. The program instructions are further executable to determine, for the test sample, local gradients at the test sample values plus values of respective ones of the optimal compensations. The program instructions are further executable to update the optimal compensations, based on the local variance and the local gradients. The program instructions are further executable to determine whether the optimal compensations converge. The program instructions are further executable to diagnose the anomalies detected by the black-box machine learning model, using the optimal compensations, in response to determining that the optimal compensations converge.

The computer system further comprises the program instructions executable to, with latest updated optimal compensations, reiterate determining the local gradients, updating the optimal compensations, and determining whether the optimal compensations converge, until convergences of optimal compensations are reached, in response to determining that the optimal compensations do not converge.

The computer-implemented method, the computer program product, and the computer system in the present invention use a fundamentally new approach to local explanations for black-box machine learning models. The optimal compensations are proposed for diagnosing anomalies detected by a black-box machine learning model. Using the optimal compensations, the computer-implemented method, the computer program product, and the computer system are capable of clearly identifying variables which are responsible for anomalies detected by a black-box machine learning model and providing explanation or diagnosis of the anomalies. The computer-implemented method, the computer program product, and the computer system in the present invention are advantageous over conventional methods, such as Local Interpretable Model-Agnostic Explanations (LIME). Experimental results presented in this document show advantages of the approach in the present invention over LIME.

DETAILED DESCRIPTION

Figure 1:
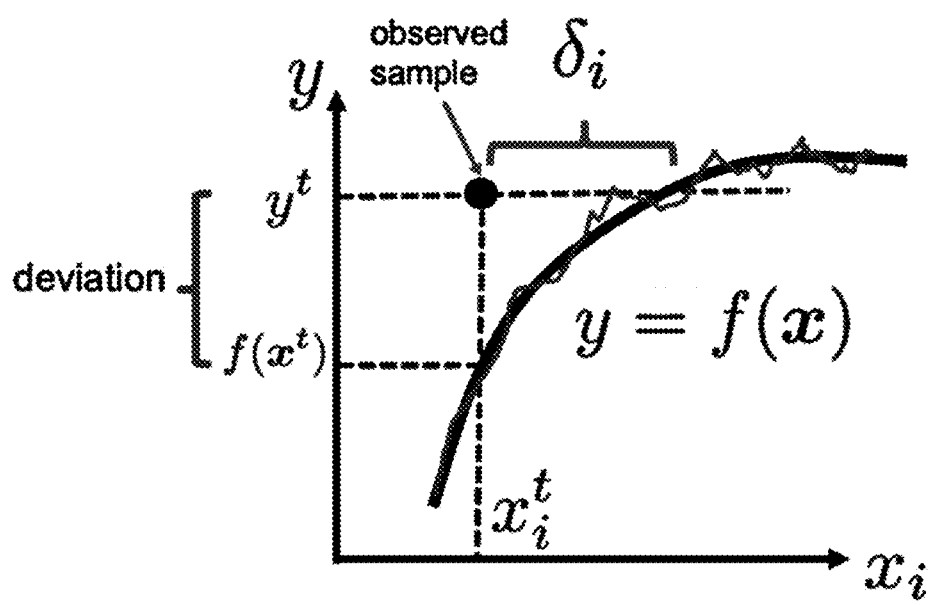
FIG. 1 shows an optimal compensation defined as an optimal perturbation needed to achieve highest likelihood in a vicinity of a test sample, in accordance with one embodiment of the present invention.

Embodiments of the present invention focus on explainability of artificial intelligence (AIX) in the specific context of anomaly detection and diagnosis. For instance, a scenario of monitoring building energy consumption is considered. Suppose there exists a black-box regression model y=f(x) for the energy consumption. In the model, y is a major business key performance indicator (KPI) and the input to the model is a multivariate sensor measurement x. The multivariate sensor measurement x is typically real valued and noisy, and thus most of the AIX methods developed specifically for image classification are not applicable. Since the model has been trained on data under normal operating conditions, deviations from predictions imply the presence of one or more anomalies in the system. Embodiments of the present invention present an approach to providing actionable explanation on detected outliers in a model agnostic manner. Provided that the model is black-box and training data is not available, a goal is to compute a credible score for each of the variables of the multivariate sensor measurement x, quantifying the extent to which they are responsible for the judgment that a given test sample is anomalous.

In this document, the boldface is used to denote vectors. The i-th dimension of a vector $\delta$ is denoted as $\delta_i$. The $\ell_1$ and $\ell_2$ norms of a vector are denoted as $\|\cdot\|_1$ and $\|\cdot\|_2$, respectively, and they are defined as $\|\delta\|_1 \triangleq \Sigma_i |\delta_i|$ and $\|\delta\|_2 \triangleq \sqrt{\Sigma_i \delta_i^2}$. The sign function sign($\delta_i$) is defined as being 1 for $\delta_i > 0$ and $-1$ for $\delta_i < 0$. For $\delta_i = 0$, the sign function takes a value in $[-1, 1]$. For a vector input, the definition applies elementwise, giving a vector of the same size as the input.

In this document, a variable and its realizations are distinguished with a superscript. For instance, $x^t$ is the t-th realization (sample) of an input variable x. For notational simplicity, this document symbolically uses p($\cdot$) to represent different probability distributions, whenever there is no confusion. For instance, p(x) is used to represent the probability density of a random variable x, while p(y|x) is a different distribution of another random variable y conditioned on x. The Gaussian distribution of a random variable y is denoted by $\mathcal{N}$ (y|•, •), where the first and the second arguments after the bar are the mean and the variance, respectively. The multivariate Gaussian distribution is defined in a similar way.

Embodiments of the present invention focus on the explainability of anomalies in regression settings rather than classification or unsupervised settings. In general, the input variable x is assumed to be noisy, multivariate, and real valued in general. A black-box, deterministic regression model y=f(x), where y∈$\mathbb{R}$ and x∈$\mathbb{R}^M$, where M is the dimensionality of the input variable x. The functional form of f(•) and the dependency on model parameters are not available. The training data on which the model was trained is also not available. The only interface to the model is x, which follows an unknown distribution p(x). Queries to get the response f(x) can be done cheaply at any x.

The goal of the proposed approach in the present invention is to compute responsibility scores (or optimal compensations, OCs) of an input multivariate variable x for each of samples $\{(x^t, y^t)\}$, which is denoted by $\mathcal{D}_{test}$ and called the test dataset. In some cases, the test dataset $\mathcal{D}_{test}$ itself has to be used to augment the training data in a cross-validation-like fashion. For example, in the building energy monitoring scenario (mentioned earlier), samples obtained in the previous week may be used to estimate the confidence of predictions to be made in the current week. In such a case, the original test set can be viewed as $\mathcal{D}_{test} \cup \mathcal{D}_{base}$, where the former is the test dataset in a narrow sense while the latter is the baseline dataset; the baseline dataset $\mathcal{D}_{base}$ is used as an additional input when making a prediction for the test dataset $\mathcal{D}_{test}$.

To reach the goal mentioned above, embodiments of the present invention propose optimal compensations (OCs), a fundamentally new approach to local explanations for black-box regression models. The optimal compensations (OCs), denoted as $\delta$, are defined as optimal perturbations needed to achieve the highest likelihood in the vicinity of a test sample, as shown in FIG. 1. The δ is called the optimal compensations (OCs) because they compensate for a loss in likelihood incurred by a wrong prediction of the output variable y (predicted by the model y=f(x)). In other words, optimal perturbations to $x^t$ are found such that $x^t+\delta$ achieves a best possible fit to a black-box regression model.

As shown in FIG. 1, f(x) may be a non-smooth curve. In the case of deep neural networks, the function f(x) is typically not smooth. FIG. 1 also shows a smoothed version of the prediction function f(x). When a local linear fit is used, the curve is guaranteed to be locally smooth. As shown in FIG. 1, the deviation represents the difference between $y^t$ of an observed sample and $f(x^t)$, where $y^t$ is corresponding to i-th variable $x_i^t$ of $x^t$ given in $\mathcal{D}_{test}$, where $f(x^t)$ is a predicted value by a black-box machine learning model. As shown in FIG. 1, $\delta_i$ (which is an optimal compensation of $x_i^t$) can be thought of as the deviation measured horizontally.

The log likelihood $\ln p(t^t|f(x^t))$ is a measure of goodness-of-fit of a test sample $(x^t, y^t)$. The present invention introduces a directly interpretable parameter δ as a correction term to x. The optimal compensations seek a best possible fit by correcting x under a certain regularization:

$$\max_{\delta} [\ln\{p(y^t|f(x^t+\delta))p(\delta)\}] \quad (1)$$

$$p(y^t|f(x^t+\delta)) = \mathcal{N}(y|f(x+\delta), \sigma^2(x)) \quad (2)$$

$$p(\delta) \propto \exp\left(-\frac{1}{2}\lambda\|\delta\|_2^2 - \nu\|\delta\|_1\right) \quad (3)$$

where $\sigma^2(x)$ is the local variance representing the uncertainty of predictions, and λ and ν are hyperparameters controlling the overall scale and the sparsity of δ. The optimal compensations (OCs) δ can be determined with a proximal gradient method, which will be discussed in later paragraphs with respect to FIG. 2.

Figure 2:
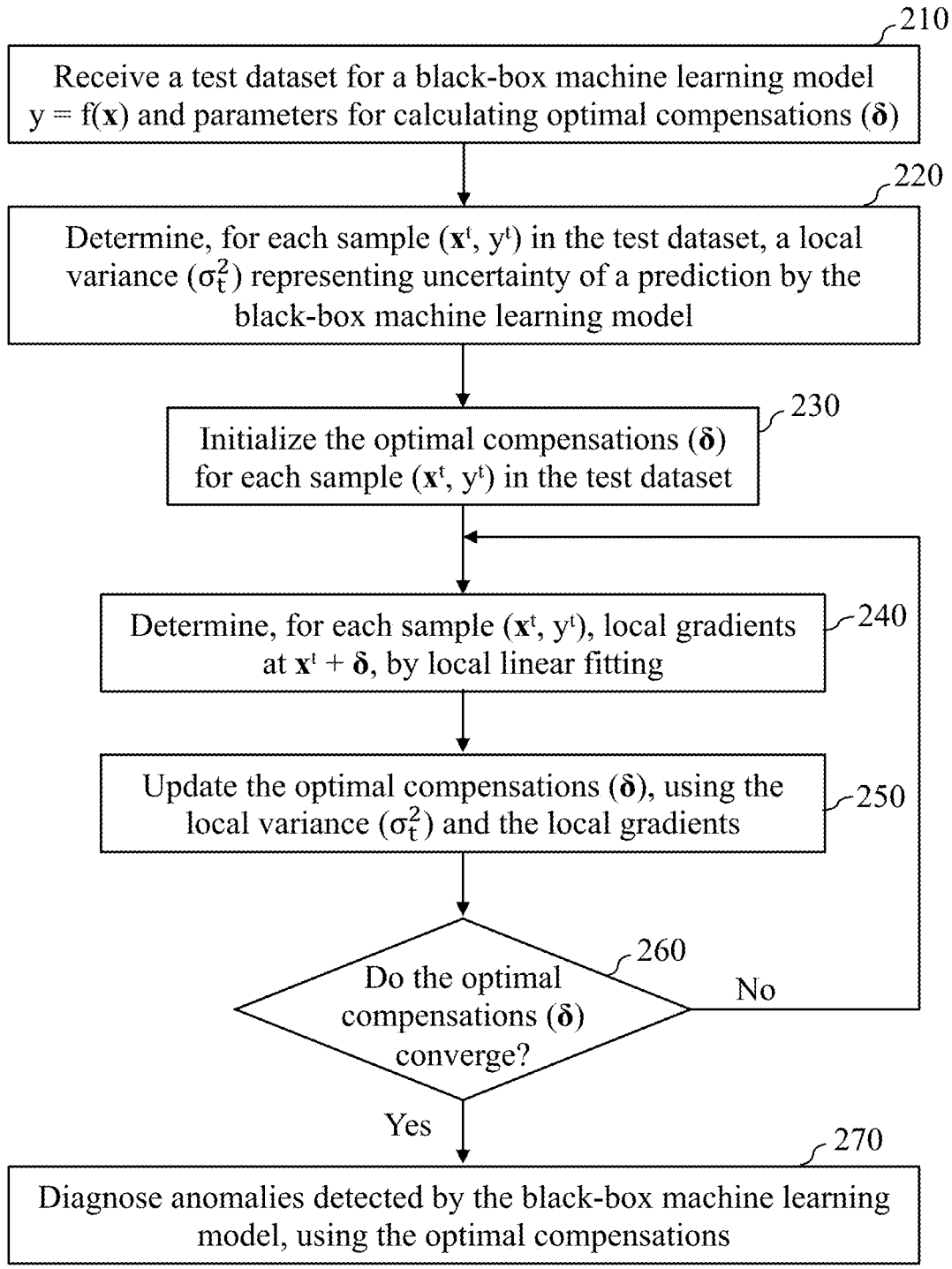
FIG. 2 presents a flowchart showing operational steps of determining optimal compensations to diagnose anomalies detected by a black-box machine learning model, in accordance with one embodiment of the present invention.

FIG. 2 presents a flowchart showing operational steps of determining optimal compensations to diagnose anomalies detected by a black-box machine learning model, in accordance with one embodiment of the present invention. The operation steps are implemented on one or more computer devices or servers. A computer device or server is described in more detail in later paragraphs with reference to FIG. 5. In another embodiment, the operational steps may be implemented on a virtual machine or another virtualization implementation being run on a computer device. In yet another embodiment, the operational steps may be implemented in a cloud computing environment. The cloud computing environment is described in later paragraphs with reference to FIG. 6 and FIG. 7.

Referring to FIG. 2, at step 210, the computer device or server receives a test dataset for a black-box machine learning model y=f(x) and parameters for calculating optimal compensations (δ). For example, the computer device or server receives the test dataset $\mathcal{D}_{test}$; optionally, the computer device or server also receives the baseline dataset $\mathcal{D}_{base}$. The test dataset $\mathcal{D}_{test}$ and the baseline dataset $\mathcal{D}_{base}$ have been discussed in a previous paragraph. The parameters include λ, ν, and κ. λ is a hyperparameter controlling the overall scale of δ, and, for example, the value of λ is typically from 0 to 1 but needs to be turned. ν is a hyperparameters controlling the sparsity of δ, and, for example, the value of ν is typically from 0 to 1 but needs to be turned. κ is a hyperparameter representing the learning rate, and, for example, it can be fixed to be 0.1.

At step 220, the computer device or server determines, for each sample $(x^t, y^t)$ in the test dataset $\mathcal{D}_{test}$, a local variance ($\sigma_t^2$) representing uncertainty of a prediction by the black-box machine learning model. As described in the next paragraphs, the predictive distribution $p(y|x)=\mathcal{N}(y|f(x), \sigma^2(x))$ is derived from the deterministic black-box regression model y=f(x).

If there are too few test samples, and thus $\mathcal{D}_{base}$ is not available, there is no choice and $\sigma_t^2$ tis set to a constant using prior knowledge. Otherwise, an estimate of $\sigma_t^2$ is obtained from a baseline set $\mathcal{D}_{base}=\{(x^{(n)}, y^{(n)})|n=1, \ldots, N_{base}\}$. For the Gaussian observation model and a given test sample $(x^t, y^t)$, a locally weighted version of maximum likelihood is considered:

$$\max_{\sigma^2} \sum_{n=1}^{N_{base}} w_n(x^t)\left\{\ln\frac{1}{\sqrt{2\pi\sigma^2}} - \frac{(y^{(n)} - f(x^{(n)}))^2}{2\sigma^2}\right\} \quad (4)$$

where $w_n(x^t)$ is the similarity between $x^t$ and $x^{(n)}$. A reasonable choice for $w_n$ is the Gaussian kernel:

$$w_n(x^t)=\mathcal{N}(x^{(n)}|x^t,\text{diag}(\eta)) \quad (5)$$

where diag(η) is a diagonal matrix whose i-th diagonal is given by $\eta_i$, which can be the same order as the sample variance of $x_i$ evaluated on $\mathcal{D}_{base}$.

The maximizer of equation (4) is found by differentiating by $\sigma^{-2}$. The solution is given by $$\sigma^2 = \frac{1}{\sum_m w_m(x^t)} \sum_{n=1}^{N_{base}} w_n(x^t)[y^{(n)} - f(x^{(n)})]^2 \quad (6)$$

This has to be computed for each $x^t$ in $\mathcal{D}_{test}$.

Referring to FIG. 2, at step 230, the computer device or server initializes optimal compensations (δ) for each sample $(x^t, y^t)$ in the test dataset. For example, the computer device or server may set δ≈0 with negligible random numbers. The optimal compensations are optimal perturbations to $x^t$ ($x^t$ represents test sample values of respective components of the multivariate input variable x).

At step 240, the computer device or server determines, for each sample $(x^t, y^t)$ in the test dataset, local gradients at $x^t+\delta$, by local linear fitting. The local gradients are calculated at the values of the given test sample $(x^t, y^t)$ plus values of respective ones of the optimal compensations. $N_s$ samples are randomly sampled in the vicinity of $x^t+\delta$ and be fitted into a linear regression model; thus, the gradients are obtained as regression coefficients. In the next paragraph, how to find the local gradients is described.

$N_s$ samples are drawn from a local distribution at $x^t+\delta$ as
$$x^{[m]} \sim \mathcal{N}(\cdot|x^t+\delta,\text{diag}(\eta)) \quad (7)$$

and a linear regression model $f=\beta_0+\beta^T x$ is fitted on the populated local dataset $\{(x^{[m]}, f^{[m]})|m=1, \ldots, N_s\}$, where $f^{[m]}=f(x^{[m]})$. By solving the least square problem, it is obtained:

$$\frac{\partial f(x^t+\delta)}{\partial \delta} \approx \beta = [\psi_s\psi_s^T + 0I_M]^{-1}\psi_s f_s \quad (8)$$

where $0|_M$ means adding small positive constants to the diagonals for numerical stability. In the above equation, it is defined that $$f_s \triangleq [f^{[1]} - \bar{f}, \ldots, f^{[N_s]} - \bar{f}]^T \qquad (9)$$

$$\psi_s \triangleq [x^{[1]} - \bar{x} \ldots, x^{[N_s]} - \bar{x}] \qquad (10)$$

As usual, the population means are defined as:

$$\bar{f} \triangleq \frac{1}{N_s} \sum_m f^{[m]} \qquad (11)$$

$$\bar{x} \triangleq \frac{1}{N_s} \sum_m x^{[m]} \qquad (12)$$

Referring to FIG. 2, at step 250, the computer device or server updates the optimal compensations ($\delta$), using the local variance ($\sigma_t^2$) determined at step 220 and the local gradients determined at step 240. The step of updating the optimal compensations ($\delta$) includes two substeps. The first substeps is to get a vector $\phi$ by $$\phi = (1 - \kappa\lambda)\delta^{old} + \kappa g(\delta^{old}) \qquad (13)$$

$$g(\delta) \triangleq \frac{1}{N_{test}} \sum_t^{N_{test}} \left\{ \frac{y^t - f(x^t + \delta)}{\sigma_t^2} \right\} \frac{\partial f(x^t + \delta)}{\partial \delta} \qquad (14)$$

where $N_{test}$ is the number of samples in the test dataset $\mathcal{D}_{test}$, where $\lambda$ is a hyperparameter controlling the overall scale of $\delta$, where $\kappa$ is a hyperparameter representing the learning rate.

The second substep is to apply the shrinkage thresholding algorithm as a result of the proximal gradient approach. For $\phi$ just obtained, the i-th component of $\delta$ is given by $$\phi_i = \begin{cases} \phi_i - \kappa\nu, & \phi_i > \kappa\nu \\ 0, & |\phi_i| - \kappa\nu \\ \phi_i + \kappa\nu, & \phi_i < -\kappa\nu \end{cases} \qquad (15)$$

where $\nu$ is a hyperparameter controlling the sparsity of $\delta$. It can be verified from the condition $\delta - \phi + \kappa\nu \, \text{sign}(\delta) = 0$. For example, if $\phi_i > \kappa\nu$ holds for the i-th dimension, by $\phi_i \pm \kappa\nu > 0$, there exists $\delta_i - \phi_i + \kappa\nu \, \text{sign}(\delta_i) = \phi_i - \kappa\nu$. Similar arguments can verify the other two cases in equation (15).

Referring to FIG. 2, at step 260, the computer device or server determines whether the optimal compensations $\delta$ converge. Convergence of $\delta$ is achieved when either the deviation $y^t - f(x^t + \delta)$ or the gradients $\partial f / \partial \delta$ at $x^t + \delta$ approaches zero. Here, the deviation is calculated by the difference between a test sample value of an output variable and a predicted value by the black-box machine learning model, and the predicted value is calculated corresponding to the test sample values plus the values of the respective ones of the optimal compensations. Here, the gradients are calculated at the test sample values plus values of respective ones of the optimal compensations. In response to determining that a value of the deviation $y^t - f(x^t + \delta)$ or $\partial f / \partial \delta$ at $x^t + \delta$ is less than a predetermined threshold value, the computer device or server determines that convergences of the optimal compensations $\delta$ are reached. In general, relying on the gradients can be problematic if the black-box model lacks smoothness, as is the case in deep neural networks.

However, the proposed gradient estimation algorithm is robust to the non-smoothness of the black-box model because the gradients are computed by local linear fitting that amounts to using a smooth surrogate of the black-box model and its gradients.

In response to determining that the optimal compensations $\delta$ do not converge (NO branch of decision step 260), the computer device or server reiterates steps 240, 250, and 260, until the convergence of the optimal compensations $\delta$ is reached. In reiterating steps 240, 250, and 260, the computer device or server uses latest updated optimal compensations $\delta$ (or optimal compensations $\delta$ that has been obtained at previous step 250).

In response to determining that the optimal compensations $\delta$ converge (YES branch of decision step 260), the optimal compensations $\delta$ (or responsibility scores) are obtained. The optimal compensations (or responsibility scores) provides outlier-specific explanation of anomalies detected by the black-box machine learning model. At step 270, the computer device or server diagnoses the anomalies detected by the black-box machine learning model, using the optimal compensations (or responsibility scores). An example of diagnosis of anomalies detected by the black-box machine learning model will be discussed in detail in later paragraphs with respect to FIG. 3.

To diagnose the anomalies detected by the black-box machine learning model, the computer device or server may provide different types of visualization depending on a business scenario, such as a daily heatmap, a histogram comparing different contributions of the input variables, and a pie chart accounting for relative contributions of the input variables. The computer device or server may provide a binary score for each of the input variables by comparing a threshold value of each input variable, and the binary score indicates whether an input variable is responsible for the anomalies. The computer device or server may provide a set of actions determined based on the optimal compensations (or responsibility scores). For example, if an optimal compensation (or a responsibility score) of the flow rate is the highest, the computer device or server may provide an action requiring "to check the valve". In another example, if there is a database that associates each input variable with typical faults and repair actions, the computer device or server may directly provide users with a prioritized list of actions.

The diagnosis or explanation of the anomalies detected by black-box machine learning models have been discussed in previous paragraphs. Now, the detection of the anomalies is discussed. Given a black-box regression model $y = f(x)$ and a test dataset $\mathcal{D}_{test}$, the computer device or server determines the degrees of anomalies of the prediction by $y = f(x)$. An anomaly score $a(x^t, y^t)$ indicates a degree of an anomaly at $(x^t, y^t)$. The computation of anomaly scores is an independent step in a procedure of detection and diagnosis (or explanation) of the anomalies and is independent of computing the optimal compensations (or responsibility scores). In some embodiments, the computer device or server computes the anomaly scores and then the optimal compensations (or responsibility scores). In other embodiments, the diagnosis or explanation of the anomalies is done by computing the optimal compensations (or responsibility scores), without the step of computation of anomaly scores. The anomaly scores may be computed in different ways described as follows.

The anomaly score $a(x^t, y^t)$ for the t-th sample $(x^t, y^t)$ may be computed by an absolute difference between the sample value $y^t$ and the model predicted value $f(x^t)$; the calculation of the anomaly score by the absolute difference is as follows:

$$a(x^t,y^t)=|y^t-f(x^t)| \quad (16)$$

The anomaly score $a(x^t, y^t)$ for the t-th sample $(x^t, y^t)$ may be computed by a t-score; the calculation of the anomaly score by the t-score is as follows:

$$a(x^t, y^t) = \frac{|y^t - f(x^t)|}{\sigma(x^t)} \quad (17)$$

where $\sigma(x^t)$ is the variance at $x^t$ and can be computed by using equation (6).

The anomaly score $a(x^t, y^t)$ for the t-th sample $(x^t, y^t)$ may be computed by using the negative log-likelihood of the Gaussian distribution; the calculation of the anomaly score by using the negative log-likelihood of the Gaussian distribution is as follows:

$$a(x^t, y^t) = \frac{1}{2}\ln 2\pi + \frac{|y^t - f(x^t)|^2}{2\sigma^2(x^t)} \quad (18)$$

where $\sigma(x^t)$ is the variance at $x^t$ and can be computed by using equation (6).

Determination of an anomaly at $(x^t, y^t)$ is done by comparing the anomaly score with a predefined threshold. In response to determining that $a(x^t, y^t)$ is greater than a predetermined threshold of the anomaly score, the computer device or server identifies an anomaly at $(x^t, y^t)$. The threshold may be predetermined with a test dataset $\mathcal{D}_{test}$ that includes known anomalies. In response to determining that $a(x^t, y^t)$ is less than the predetermined threshold, the computer device or server determines that $(x^t, y^t)$ has no anomaly. For a set of samples given, a mean of anomaly scores of all samples in the test dataset may be used. In addition to the mean, any linear or non-linear transformation of anomaly score or anomaly scores may be used.

As an example, an experiment of the application of the present invention is described as follows. In the experiment, the present invention was applied to a building administration task. The energy consumption data for an office building in India was used in this experiment. The total wattage was predicted by a black-box machine learning model as a function of weather-related (temperature, humidity, etc.) and time-related variables (time of day, day of week, month, etc.).

Test data for one year was obtained, and a test dataset was with 12 input variables recorded hourly. First, $\sigma^2$ was computed according to equation (6) in which $(x^t, y^t)$ was left out for each t, and Ti equaled the same as the variance of the entire test dataset. For each of the test samples, the anomaly score was computed, which resulted in several anomalies being detected. The anomaly scores were plotted over a period of time. The plot of the anomalies is presented in part (A) of both FIG. 3 and FIG. 4, and it shows some of the most conspicuous anomalies. The goal of this experiment was to diagnose who or what is responsible for these anomalies.

Figure 3:
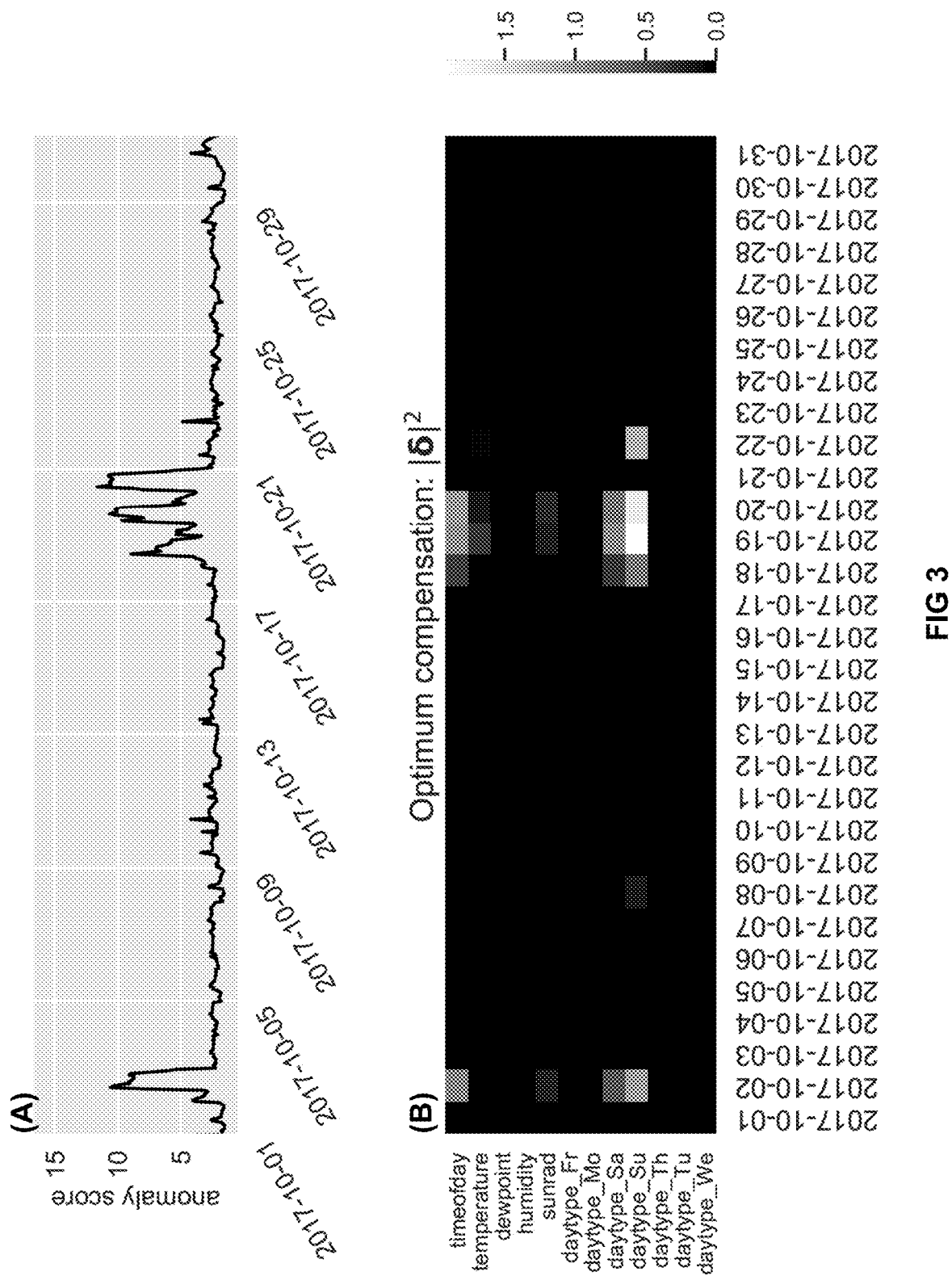
FIG. 3 presents anomaly scores of building energy data and optimal compensations calculated by using a method showing in FIG. 2, in accordance with one embodiment of the present invention.

To obtain insights regarding these detected anomalies, the approach disclosed in the present invention was used, and optimal compensations (or responsibility scores) were computed for each $(x^t, y^t)$ in the test dataset, using the steps described in previous paragraphs with respect to FIG. 2. In computing optimal compensations, $N_{test}$ (the number of samples in the test dataset $\mathcal{D}_{test}$) was equal to 24. FIG. 3 presents anomaly scores of building energy data and optimal compensations (or responsibility scores) calculated by using a method described in previous paragraphs with respect to FIG. 2. In part (B) of FIG. 3, optimal compensations (or responsibility scores) were presented by $|\delta|^2$. As shown in FIG. 3, the optimal compensations (or responsibility scores) clearly highlights a few variables whenever the anomaly scores are exceptionally high.

As shown in FIG. 3, the variables highlighted around October 19 (Thursday) are 'timeofday', 'daytype_Sa', and 'daytype_Su', implying that those days had an unusual daily wattage pattern for a weekday and their "weekend-ness" could have been higher than observed. Interestingly, it turned out that the 19th was a national holiday in India and many workers were off on and around that date. Thus, it can be concluded that the anomaly is most likely not due to any faulty building facility but due to the model limitation lacking full calendar information.

Figure 4:
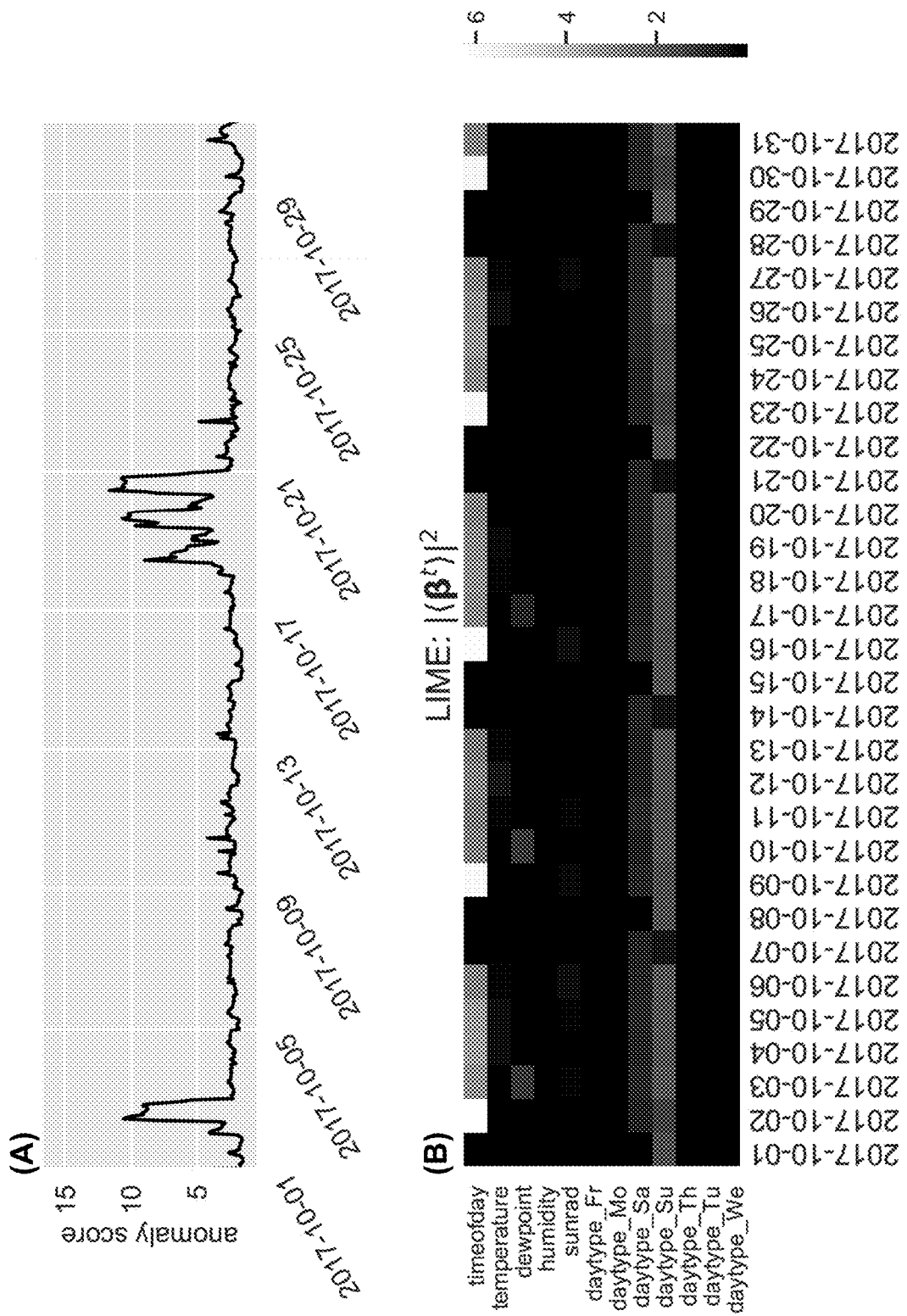
FIG. 4 presents anomaly scores of building energy data and regression coefficients calculated by using a conventional method—Local Interpretable Model-Agnostic Explanations (LIME).

For the purpose of comparing the method of the present invention and a conventional method, the same test dataset was analyzed by using Local Interpretable Model-Agnostic Explanations (LIME). Using LIME, regression coefficients ($\beta^t$) for every sample were computed. In part (B) of FIG. 4, the regression coefficients ($\beta^t$) for every sample were presented by $|<\beta>|^2$. FIG. 4 presents anomaly scores of building energy data and regression coefficients calculated by using LIME. As shown in FIG. 4, LIME does not provide much information beyond the trivial weekly patterns. The patterns of Lime shows evidence of insensitivity to anomalies or outliers.

Figure 5:
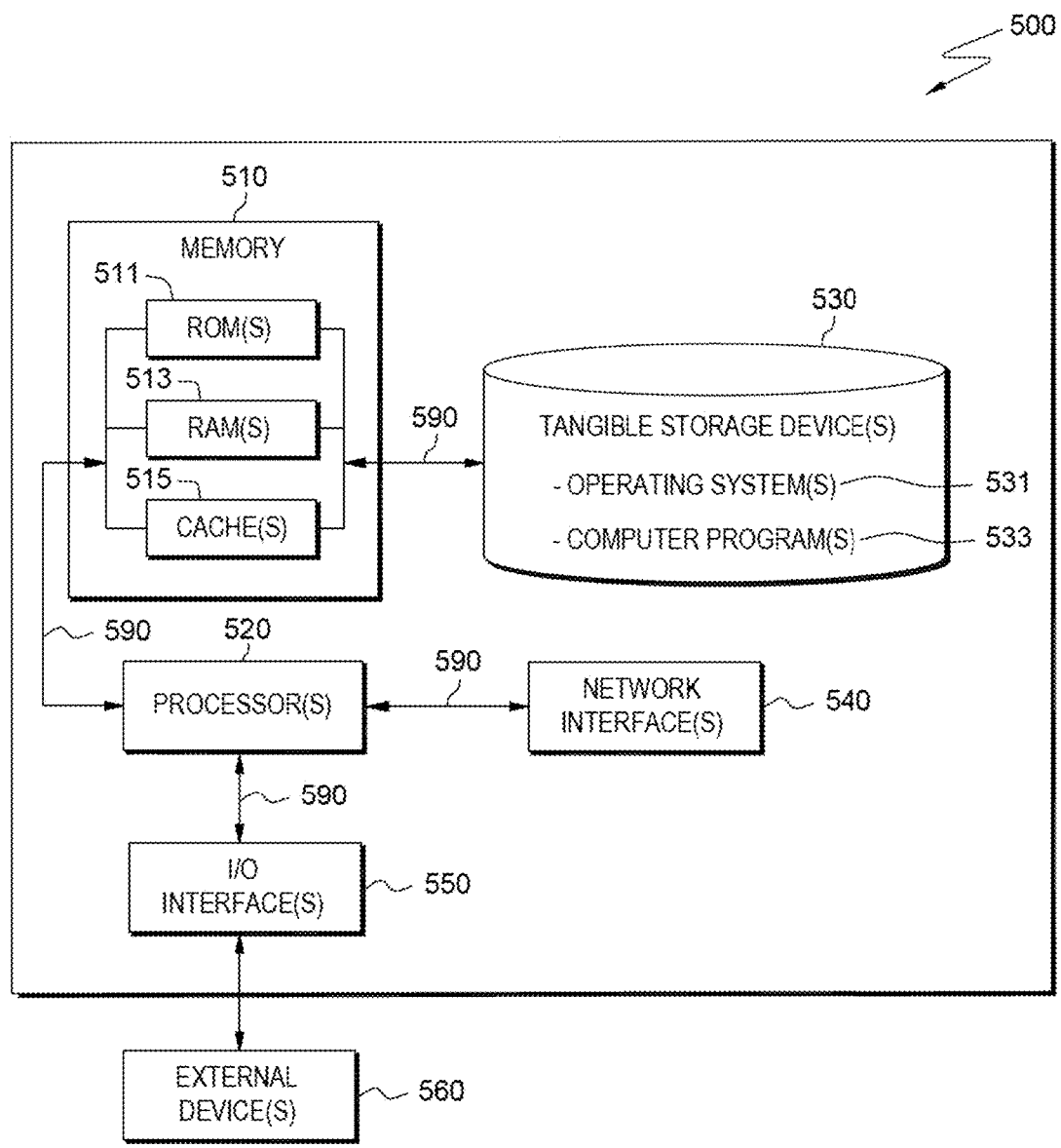
FIG. 5 is a diagram illustrating components of a computing device or a server, in accordance with one embodiment of the present invention.

FIG. 5 is a diagram illustrating components of computing device or server 500, in accordance with one embodiment of the present invention. It should be appreciated that FIG. 5 provides only an illustration of one implementation and does not imply any limitations with regard to the environment in which different embodiments may be implemented.

Referring to FIG. 5, computing device or server 500 includes processor(s) 520, memory 510, and tangible storage device(s) 530. In FIG. 5, communications among the above-mentioned components of computing device or server 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computing device or server 500 further includes I/O interface(s) 550. I/O interface(s) 550 allows for input and output of data with external device(s) 560 that may be connected to computing device or server 500. Computing device or server 500 further includes network interface(s) 540 for communications between computing device or server 500 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
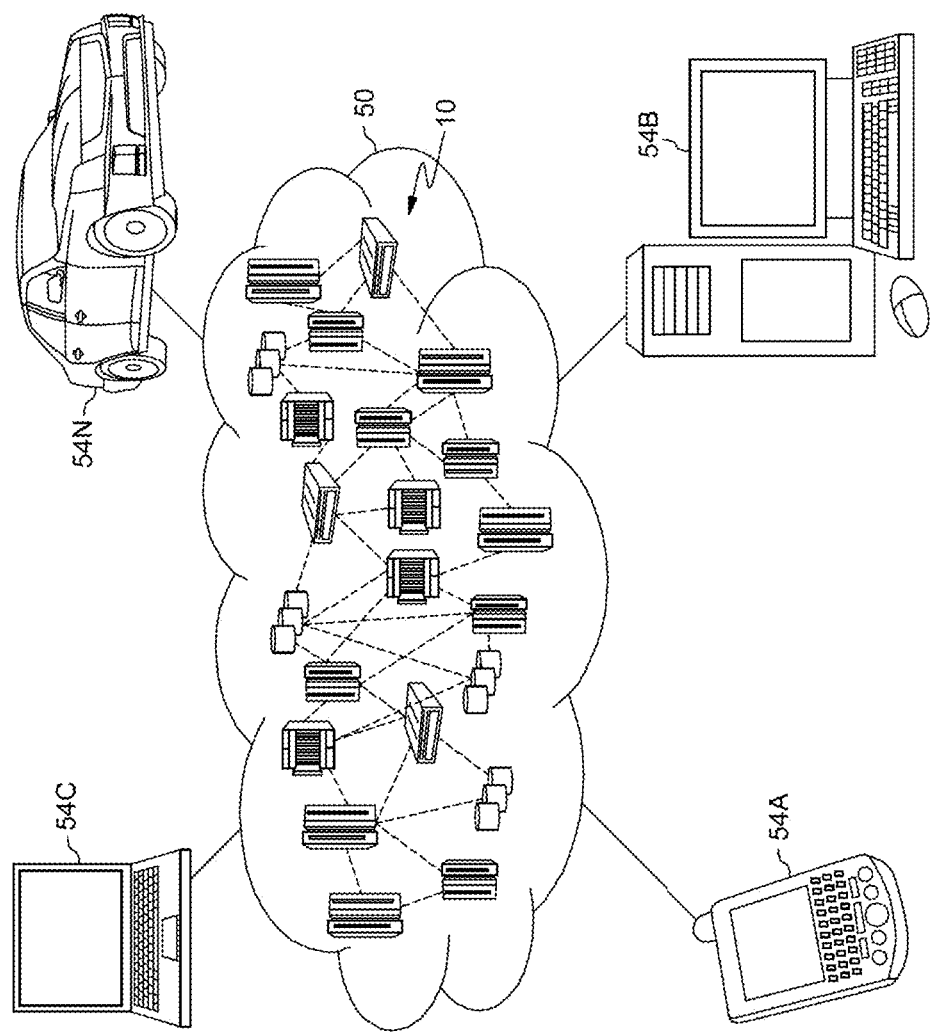
FIG. 6 depicts a cloud computing environment, in accordance with one embodiment of the present invention.

Referring now to FIG. 6, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 7:
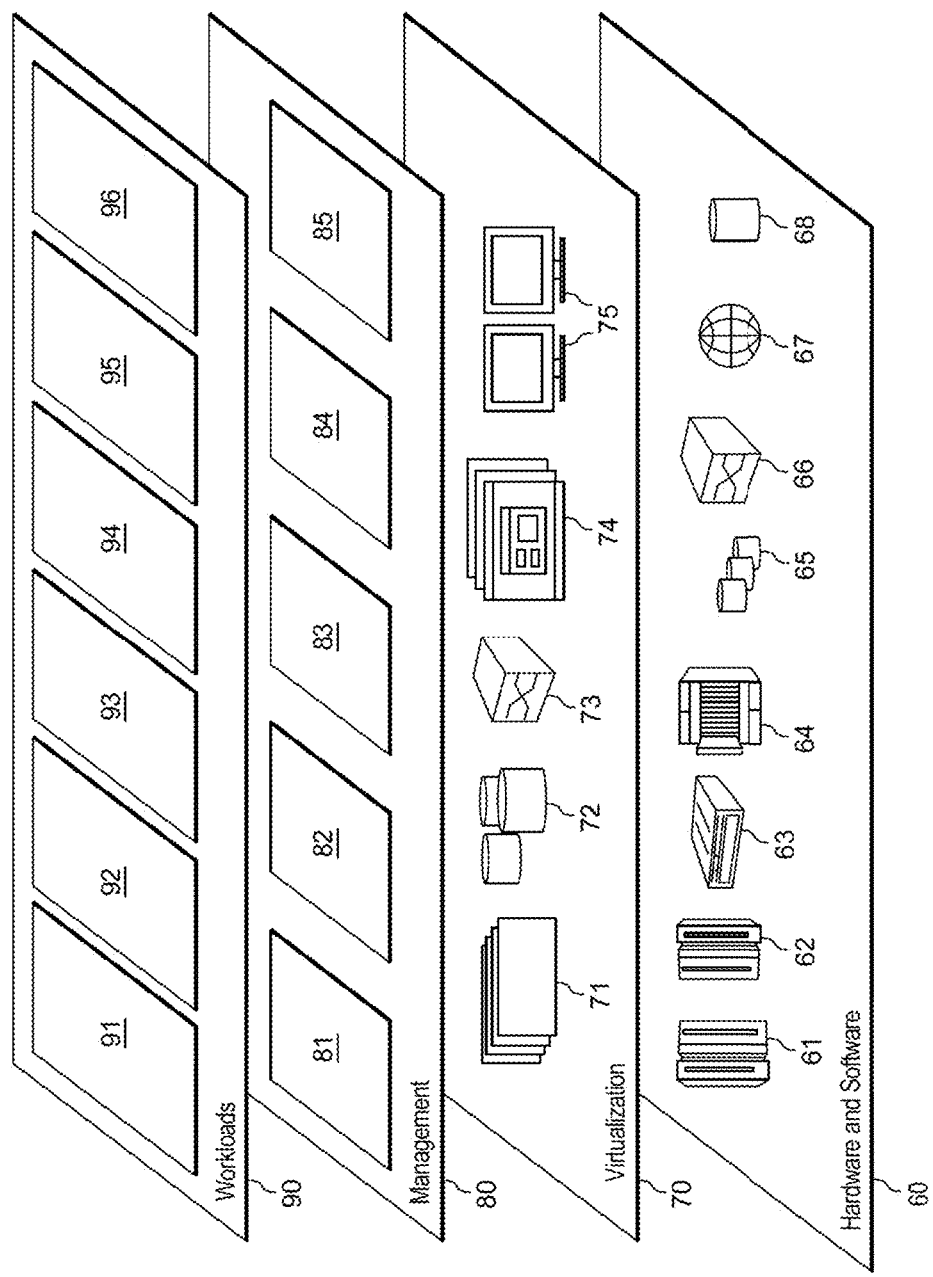
FIG. 7 depicts abstraction model layers in a cloud computing environment, in accordance with one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of diagnosing anomalies detected by black-box machine learning models in a cloud computing environment.

What is claimed is:

1. A computer-implemented method for diagnosing anomalies which are deviations from predictions by a black-box machine learning model, the method comprising:
   receiving, by a computer, a test dataset for the black-box machine learning model, wherein each test sample in the test dataset includes test sample values of respective components of a multivariate input variable and a test sample value of an output variable;
   determining, by the computer, a local variance of each test sample in the test dataset, the local variance representing uncertainty of a prediction by the black-box machine learning model, wherein the local variance of each test sample is computed based on a difference between predicted values by the black-box machine learning model and test sample values of the output variable;
   initializing, by the computer, for each test sample in the test dataset, optimal compensations, wherein the optimal compensations are defined as optimal perturbations needed to achieve a highest likelihood in a vicinity of the test sample values of the respective components of the multivariate input variable and the optimal compensations represent deviations between multivariate input variable values by which the black-box machine learning model predicts a value being equal to the test sample value of the output variable and the test sample values of the respective components of the multivariate input variable;
   determining, by the computer, for each test sample in the test dataset, a local gradient of the black-box machine learning model at a point with values that are summations of the test sample values of the respective components of the multivariate input variable and values of the optimal compensations, wherein the local gradient is with respect to the optimal compensations;
   updating, by the computer, for each test sample in the test dataset, the optimal compensations, based on the local variance and the local gradient;
   determining, by the computer, for each test sample in the test dataset, whether the optimal compensations converge;
   in response to determining that the optimal compensations converge, obtaining, by the computer, for each test sample in the test dataset, final values of the optimal compensations; and
   diagnosing, by the computer, which one or more components in the multivariate input variable are responsible for the anomalies, using the final values of the optimal compensations.

2. The computer-implemented method of claim 1, further comprising:
   in response to determining that the optimal compensations do not converge, reiterating, by the computer, determining the local gradient, updating the optimal compensations, and determining whether the optimal compensations converge, until convergences of the optimal compensations are reached.

3. The computer-implemented method of claim 1, wherein the optimal compensations are initialized with negligible random numbers which are close to zero.

4. The computer-implemented method of claim 1, wherein the local gradient is computed by local linear fitting and the local gradient is obtained as regression coefficients.

5. The computer-implemented method of claim 1, further comprising:
   in response to determining that a deviation between the test sample value of the output variable and a predicted value by the black-box machine learning model is less than a predetermined threshold, determining, by the computer, that convergences of the optimal compensations are reached; and
   wherein the predicted value is calculated at the point with the values that are the summations of the test sample values of the respective components of the multivariate input variable and values of the optimal compensations.

6. The computer-implemented method of claim 1, further comprising:
   in response to determining that the local gradient is less than a predetermined threshold, determining, by the computer, that convergences of the optimal compensations are reached.

7. The computer-implemented method of claim 1, further comprising:
   receiving, by the computer, parameters for determining the optimal compensations; and
   wherein the parameters includes a hyperparameter controlling an overall scale of the optimal compensations, a hyperparameters controlling a sparsity of the optimal compensations, and a hyperparameter representing a learning rate.

8. A computer program product for diagnosing anomalies which are deviations from predictions by a black-box machine learning model, the computer program product comprising a computer readable storage medium having program instructions embodied therewith, the program instructions executable by one or more processors, the program instructions executable to:
   receive, by a computer, a test dataset for the black-box machine learning model, wherein each test sample in the test dataset includes test sample values of respective components of a multivariate input variable and a test sample value of an output variable;
   determine, by the computer, a local variance of each test sample in the test dataset, the local variance representing uncertainty of a prediction by the black-box machine learning model, wherein the local variance of each test sample is computed based on a difference between predicted values by the black-box machine learning model and test sample values of the output variable;
   initialize, by the computer, for each test sample in the test dataset, optimal compensations, wherein the optimal compensations are defined as optimal perturbations needed to achieve a highest likelihood in a vicinity of the test sample values of the respective components of the multivariate input variable and the optimal compensations represent deviations between multivariate input variable values by which the black-box machine learning model predicts a value being equal to the test sample value of the output variable and the test sample values of the respective components of the multivariate input variable;

determine, by the computer, for each test sample in the test dataset, a local gradient of the black-box machine learning model at a point with values that are summations of the test sample values of the respective components of the multivariate input variable and values of the optimal compensations, wherein the local gradient is with respect to the optimal compensations;

update, by the computer, for each test sample in the test dataset, the optimal compensations, based on the local variance and the local gradient;

determine, by the computer, for each test sample in the test dataset, whether the optimal compensations converge;

in response to determining that the optimal compensations converge, obtain, by the computer, for each test sample in the test dataset, final values of the optimal compensations; and diagnose, by the computer, which one or more components in the multivariate input variable are responsible for the anomalies, using the final values of the optimal compensations.

9. The computer program product of claim 8, further comprising the program instructions executable to:

in response to determining that the optimal compensations do not converge, reiterate, by the computer, determining the local gradient, updating the optimal compensations, and determining whether the optimal compensations converge, until convergences of the optimal compensations are reached.

10. The computer program product of claim 8, wherein the optimal compensations are initialized with negligible random numbers which are close to zero.

11. The computer program product of claim 8, wherein the local gradient is computed by local linear fitting and the local gradient is obtained as regression coefficients.

12. The computer program product of claim 8, further comprising the program instructions executable to:

in response to determining that a deviation between the test sample value of the output variable and a predicted value by the black-box machine learning model is less than a predetermined threshold, determine, by the computer, that convergences of the optimal compensations are reached; and wherein the predicted value is calculated at the point with the values that are the summations of the test sample values of the respective components of the multivariate input variable and values of the optimal compensations.

13. The computer program product of claim 8, further comprising the program instructions executable to:

in response to determining that the local gradient is less than a predetermined threshold, determine, by the computer, that convergences of the optimal compensations are reached.

14. The computer program product of claim 8, further comprising the program instructions executable to:

receive, by the computer, parameters for determining the optimal compensations; and wherein the parameters includes a hyperparameter controlling an overall scale of the optimal compensations, a hyperparameters controlling a sparsity of the optimal compensations, and a hyperparameter representing a learning rate.

15. A computer system for diagnosing anomalies which are deviations from predictions by a black-box machine learning model, the computer system comprising:

one or more processors, one or more computer readable tangible storage devices, and program instructions stored on at least one of the one or more computer readable tangible storage devices for execution by at least one of the one or more processors, the program instructions executable to:

receive, by a computer, a test dataset for the black-box machine learning model, wherein each test sample in the test dataset includes test sample values of respective components of a multivariate input variable and a test sample value of an output variable;

determine, by the computer, a local variance of each test sample in the test dataset, the local variance representing uncertainty of a prediction by the black-box machine learning model, wherein the local variance of each test sample is computed based on a difference between predicted values by the black-box machine learning model and test sample values of the output variable;

initialize, by the computer, for each test sample in the test dataset, optimal compensations, wherein the optimal compensations are defined as optimal perturbations needed to achieve a highest likelihood in a vicinity of the test sample values of the respective components of the multivariate input variable and the optimal compensations represent deviations between multivariate input variable values by which the black-box machine learning model predicts a value being equal to the test sample value of the output variable and the test sample values of the respective components of the multivariate input variable;

determine, by the computer, for each test sample in the test dataset, a local gradient of the black-box machine learning model at a point with values that are summations of the test sample values of the respective components of the multivariate input variable and values of the optimal compensations, wherein the local gradient is with respect to the optimal compensations;

update, by the computer, for each test sample in the test dataset, the optimal compensations, based on the local variance and the local gradient;

determine, by the computer, for each test sample in the test dataset, whether the optimal compensations converge;

in response to determining that the optimal compensations converge, obtain, by the computer, for each test sample in the test dataset, final values of the optimal compensations; and diagnose, by the computer, which one or more components in the multivariate input variable are responsible for the anomalies, using the final values of the optimal compensations.

16. The computer system of claim 15, further comprising the program instructions executable to:

in response to determining that the optimal compensations do not converge, reiterate, by the computer, determining the local gradient, updating the optimal compensations, and determining whether the optimal compensations converge, until convergences of the optimal compensations are reached.

17. The computer system of claim 15, wherein the optimal compensations are initialized with negligible random numbers which are close to zero.

18. The computer system of claim 15, wherein the local gradient is computed by local linear fitting and the local gradient is obtained as regression coefficients.

19. The computer system of claim 15, further comprising the program instructions executable to:
   in response to determining that a deviation between the test sample value of the output variable and a predicted value by the black-box machine learning model is less than a predetermined threshold, determine, by the computer, that convergences of the optimal compensations are reached; and
   wherein the predicted value is calculated at the point with the values that are the summations of the test sample values of the respective components of the multivariate input variable and values of the optimal compensations.

20. The computer system of claim 15, further comprising program instructions executable to:
   in response to determining that the local gradient is less than a predetermined threshold, determine, by the computer, that convergences of the optimal compensations are reached.

* * * * *